United States Patent
Nicolson et al.

(10) Patent No.: US 10,527,198 B2
(45) Date of Patent: Jan. 7, 2020

(54) PIPELAY REEL WITH FLANGE CHUTE AND METHOD OF USE

(71) Applicant: NATIONAL OILWELL VARCO, L.P., Houston, TX (US)

(72) Inventors: Thomas Nicolson, Argyll (GB); Ross Suckling, Glasgow (GB); Alexander Carslaw, Paisley (GB)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 15/919,954

(22) Filed: Mar. 13, 2018

(65) Prior Publication Data

US 2019/0285199 A1    Sep. 19, 2019

(51) Int. Cl.
*F16L 1/235* (2006.01)
*F16L 1/20* (2006.01)
*B63B 35/04* (2006.01)

(52) U.S. Cl.
CPC .............. *F16L 1/207* (2013.01); *B63B 35/04* (2013.01); *F16L 1/205* (2013.01)

(58) Field of Classification Search
CPC ..................................................... F16L 1/202
USPC ...................................... 405/168.3; 242/615
See application file for complete search history.

(56) References Cited

U.S. PATENT DOCUMENTS

| 3,855,835 A | 12/1974 | Tisdale et al. |
| 4,871,127 A * | 10/1989 | Clark ................. B65H 54/2896 242/364 |
| 2015/0203326 A1 | 7/2015 | Hamaguchi et al. |

FOREIGN PATENT DOCUMENTS

EP    0868621 A1    10/1998

OTHER PUBLICATIONS

"International Application Serial No. PCT/US2019/021868, International Search Report dated May 17, 2019", 4 pgs.
"International Application Serial No. PCT/US2019/021868, Written Opinion dated May 17, 2019", 5 pgs.

* cited by examiner

*Primary Examiner* — Sean D Andrish
(74) *Attorney, Agent, or Firm* — Schwegman Lundberg & Woessner, P.A.

(57) ABSTRACT

Novel and advantageous pipelay reel systems and methods for use in laying flexible or rigid pipe or tubing in on and offshore operations. The pipelay reel system may have a pipelay reel having a drum arranged between two flanges. At least one flange of the reel may have a chute configured to receive an adapter coupled to a starting end of the pipe to be spooled on the reel. An initiation line coupled to a winch and intersecting the flange chute may be used to position the adapter with respect to a receiving end of the flange chute, and the reel may be rotated to pull the adapter down the chute to a latching end of the chute. Moreover, a latch may be used to secure the adapter in the chute such that the pipe may be spooled onto the reel.

20 Claims, 16 Drawing Sheets

PIPELAY REEL WITH FLANGE CHUTE AND METHOD OF USE

FIELD OF THE INVENTION

The present disclosure relates to novel and advantageous reel systems for spooling and unspooling pipe, cable, line, tubular members, rope, or other semi-flexible elongate elements. Particularly, the present disclosure relates to novel and advantageous reel systems configured for efficient initiation and abandonment of pipe or other elongate elements. More particularly, the present disclosure relates to reel systems with a reel having a flange chute for securing a starting end of a pipe.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various equipment and methods may be used to lay flexible or rigid pipe or tubing for both on and offshore operations. With respect to offshore operations, an offshore vessel may be used to dispense and lay flexible or rigid pipe or tubing from a pipelay reel. Pipe or tubing may be unspooled from the reel and laid on the seabed, for example. Pipelay reels may generally be vertical or horizontal reels—that is, a pipelay reel may be configured on an offshore vessel such that the reel rotates on a horizontal plane or a vertical plane as the pipe is unspooled.

The process of installing or initiating pipe onto a pipelay reel for spooling, before the pipe can be laid, can be a relatively time consuming, difficult, and/or dangerous process. Additionally, the installation or initiation process may require a variety of machinery and tools, as well as workers to be present at or near the free end of the line and the spool. In particular, initiation of pipe onto a pipelay reel may include attaching or coupling a starting end of the pipe to the reel and, in particular, the drum portion of the reel, such that the pipe may be fed onto and spooled onto the reel. Conventional pipe initiation methods commonly use a combination of pulling, hoisting, and sometimes hydraulic push systems to align a starting end of the pipe onto the reel. Additionally, conventional systems often require the use of cranes and manbaskets, as well as fall arrest equipment, such that workers can help position the pipe onto the reel. In this way, processes for initiation of pipe onto a pipelay reel can demand a relatively high amount of time and equipment. Moreover, where pipe is to be abandoned, or removed from the reel, such as after all of the pipe has been unspooled and laid on the seabed, processes for decoupling or detaching the starting end from the reel may involve more time and equipment. Additionally, in some cases, the processes of installation of the pipe onto the reel and abandonment of the pipe from the reel may require the use of different equipment, thus increasing storage demands.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a pipelay reel system having an adapter for coupling to a starting end of a pipe, a pipelay reel rotatable about an axis, and an initiation line. The pipelay reel may have a drum arranged between two flanges, and at least one flange may have a flange chute with an opening configured to receive the adapter. Additionally, the initiation line may extend from a winch and may be configured for coupling to the adapter. The initiation line may additionally extend parallel to the flanges and may be configured to pull the adapter toward the opening of the flange chute. In some embodiments, the pipelay reel system may include a pipe with a starting end coupled to the adapter. The initiation line may additionally extend along a same plane on which the opening of the flange chute is arranged, and may be configured to intersect the opening at a radial location of the opening. The initiation line may also extend across an outer surface of the drum. The flange chute may extend between the opening and the drum. In some embodiments, the flange having the flange chute may additionally have a latch configured to secure the adapter in the chute. The latch may be a clamshell latch. In some embodiments, the chute may extend between a first end and a second end, and the opening may be arranged at the first end, with the latch arranged at the second end.

The present disclosure, in one or more embodiments, additionally relates to a method of using a pipelay reel system. The method may include coupling an initiation line to an adapter arranged at a starting end of a pipe; and rotating a pipelay reel about a longitudinal axis, the pipelay reel having a drum arranged between two flanges with a flange chute arranged on one of the flanges, the flange chute having an opening arranged on an edge of the flange and configured to receive the adapter. The method may additionally include using the initiation line to pull the adapter along an axis intersecting the opening of the flange chute at a radial location of the flange chute until the adapter engages the flange chute at the opening; rotating the pipelay reel, such that the adapter slides down the chute toward the drum; and activating a latch to secure the adapter within the flange chute. In some embodiments, the method may include decoupling the initiation line from the adapter, and spooling the pipe onto the drum. Moreover, the method may include unspooling the pipe from the drum; coupling the initiation line to the adapter; disengaging the latch; and rotating the pipelay reel about its longitudinal axis, such that the adapter slides up the chute and out through the opening. The flange chute may have a length extending between a first end and a second end opposing the first end, where the opening is arranged at the first end and the latch is arranged at the second end. The latch may be activated automatically when the adapter reaches the second end. In some embodiments, the opening of the flange chute may have a bell shape.

The present disclosure, in one or more embodiments, additionally relates to a pipelay reel having a drum with a longitudinal axis, and a pair of flanges, each flange arranged at an end of the longitudinal axis. The drum may be configured to rotate about its longitudinal axis, and may be configured for spooling and unspooling a pipe. Moreover, each flange may have a flange extension portion extending beyond an outer surface of the drum. The reel may additionally have a flange chute arranged on a flange extension portion of a flange, the flange chute having a length extending perpendicular to the longitudinal axis of the drum. In some embodiments, the flange chute may have a first end arranged at an outer edge of the flange on which it is arranged and a second end opposing the first end. The flange chute may have a latch arranged at the second end configured to secure and position a starting end of a pipe therein. The latch may be configured to receive an adapter coupled to the starting end of the pipe, and the latch may be a clamshell latch in some embodiments. Additionally, the flange chute may have a pair of sidewall extension portions defining a channel parallel with an inner surface of the flange extension portion and extending along the length of the chute.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous pipelay reel systems and methods for use in laying or collecting flexible, semi-flexible, or rigid pipe or tubing for on and offshore operations. In particular, pipelay reel system and methods of the present disclosure may provide for more efficient initiation of a starting end of a pipe onto a reel, and for more efficient abandonment of the starting end of the pipe from the reel. A pipelay reel system of the present disclosure may have a pipelay reel having a drum arranged between two flanges. At least one flange of the reel may have a chute configured to receive an adapter coupled to a starting end of the pipe to be spooled on the reel. An initiation line coupled to a winch may be used to position the adapter at or near a receiving end of the flange chute, and the reel may be rotated such that tension in the line pulls the adapter down the chute to a latching end of the chute. Moreover, a latch may be used to secure the adapter in the chute such that the pipe may be spooled onto the reel. To abandon the pipe after use, the latch may be disengage, and the reel may be rotated to cause the adapter to slide out of the flange chute. The initiation line may be used to create an upward force to urge the adapter out of the chute.

Figure 1:
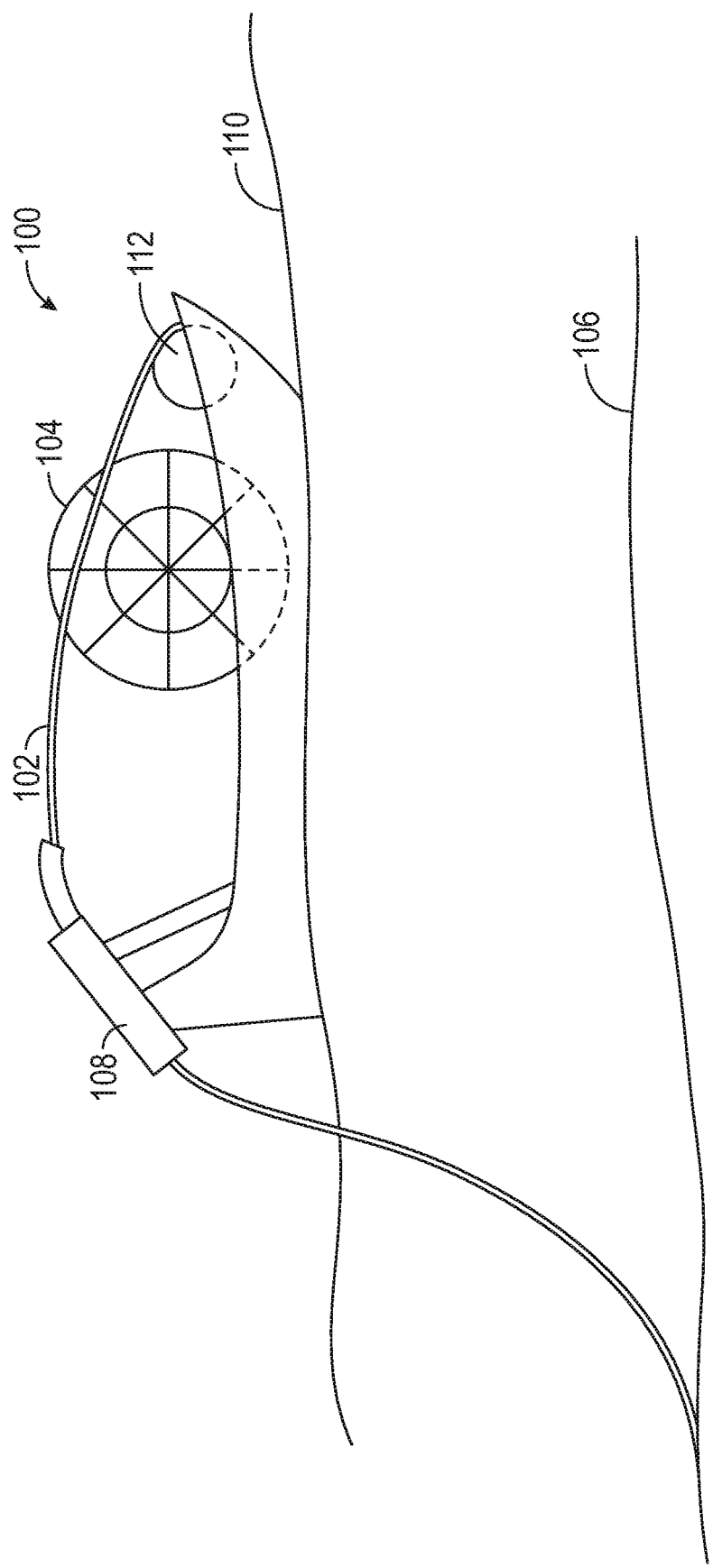
FIG. 1 is a schematic side view diagram of an offshore vessel having a pipelay reel system of the present disclosure, according to one or more embodiments.

Turning now to FIG. 1, a barge or vessel 100 having a pipelay reel system of the present disclosure is shown, according to at least one embodiment. The vessel 100 may generally be configured for unspooling pipe 102 from a reel 104 and laying the pipe along the seabed 106. As shown, a pipelay reel 104 may be arranged on the vessel 100. The reel 104 may have spooled thereon a flexible or rigid pipe 102 or other product. Although a horizontal-axis reel 104 is shown on the vessel 100 of FIG. 1, in some embodiments, the pipelay reel may be a vertical reel. That is, the pipelay reel 104 may be arranged such that it may rotate on a vertical axis as pipe 102 is unspooled from the reel. The vessel 100 may additionally have a ramp 108 through, over, or across which the pipe 102 may be passed as it is unspooled from the reel 104. The ramp 108 may be or provide a tensioner for tensioning the pipe 102 and/or a straightener for straightening the pipe after it is unspooled. The pipe 102 may be directed below the water line 110 and to the seabed 106 after it exits the ramp 108. The pipe 102 may generally be placed along the seabed 106 as the vessel 100 moves away from the laydown location. In some embodiments, the vessel 100 may have one or more onboard winches or drawworks 112. The one or more winches or drawworks 112 may be configured for initiating and abandoning pipe 102 on and off the reel 104 in some embodiments. In some embodiments, the vessel 100 may have additional and/or alternative equipment or components.

Figure 2:
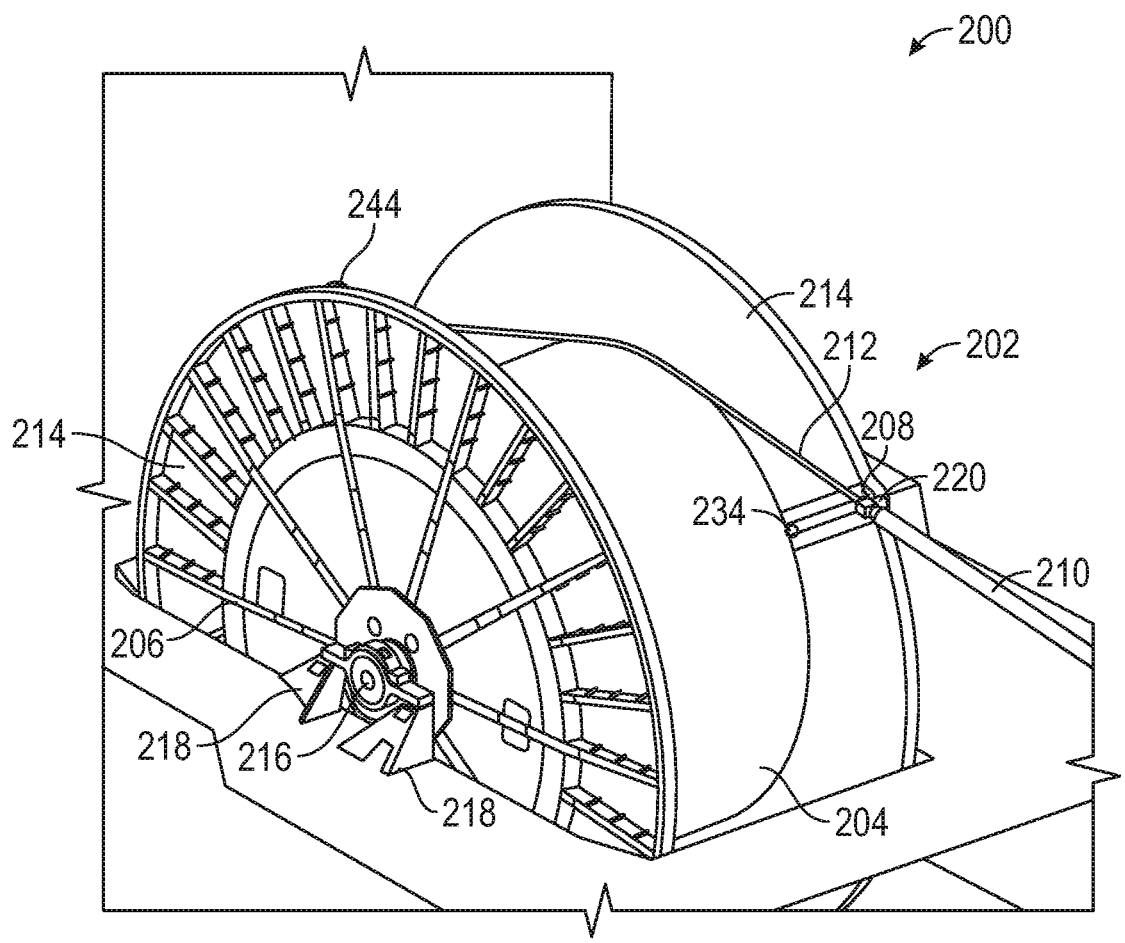
FIG. 2 is a perspective view of a pipelay reel system of the present disclosure, according to one or more embodiments.
Figure 3:
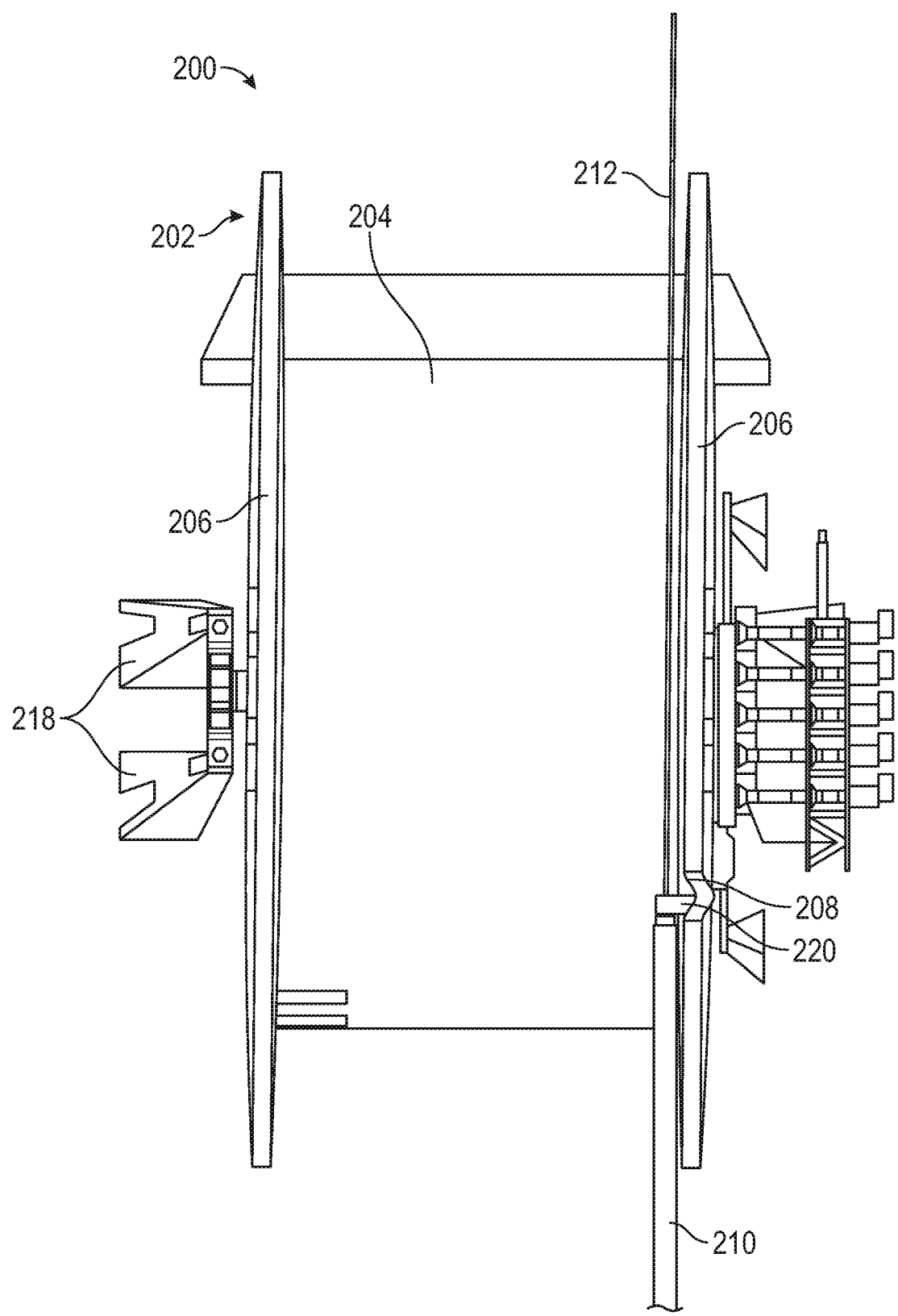
FIG. 3 is an end view of a pipelay reel system of the present disclosure, according to one or more embodiments.

Turning now to FIG. 2 FIGS. 2 and 3, a pipelay reel system 200 of the present disclosure is shown, according to at least one embodiment. The system 200 may be arranged on a barge or vessel, such as the vessel described with respect to FIG. 1. Additionally, however, the system 200 may be configured for land use in some embodiments, for use in onshore pipelaying operations. As shown, the system 200 may include a reel 202 having a drum 204 arranged between two flanges 206. At least one flange 206 may have a chute 208 configured to receive a pipe end 210. In one or more embodiments, the flange 206 or flanges may have multiple chutes radially arranged about the drum 204. Additionally, an initiation line 212 may be arranged on a winch, and may be configured to pull the pipe toward the chute 208.

The reel 202 may be configured for on and/or offshore use. In some embodiments, the reel 202 may be arranged on an offshore vessel, such as a pipelaying vessel. The reel may generally have a drum 204 arranged between two flanges 206, and may be configured to receive coiled pipe or tubing wrapped around the drum. In some embodiments, the reel 202 may be configured to receive a coiled line or cable. The reel 202 may additionally be configured to rotate, such that the pipe, tubing, or other product may be coiled onto and drawn off of the reel. In particular, the reel 202 may be configured to rotate about a central axis running longitudinally through a center of the drum.

The drum 204 may have a generally round or cylindrical shape, such that pipe, tubing, or another product may be coiled around an outer circular surface of the drum. In general, the drum 204 may be sized and configured to receive a desired quantity and size of pipe, tubing, or other product. The drum 204 may have a diameter of between approximately 5 meters and approximately 35 meters, or between approximately 7.5 meters and approximately 30 meters, or between approximately 10 meters and approximately 25 meters. In other embodiments, the drum 204 may have any other suitable diameter. Additionally, the drum 204 may have a width extending between the two flanges 206 of between approximately 1 meter and approximately 25 meters, or between approximately 3 meters and approximately 20 meters, or between approximately 5 meters and approximately 15 meters. In other embodiments, the drum 204 may have any other suitable width.

Each flange 206 may be arranged at or near an end of the drum 204, such that the width of the drum extends between the two flanges. Each flange 206 may have a circular shape and a generally thin or flattened thickness, relative to the drum width. The flanges 206 may have a diameter larger than that of the drum 204, such that the flanges extend outward beyond the circular perimeter of the drum. In this way, the flanges 206 may help prevent pipe from sliding off a side of the reel 202. For example, as the pipe moves laterally across the width of the drum 204 during spooling or unspooling, the flanges 206 may help ensure that the pipe remains aligned over the drum. In some embodiments, each flange 206 may have a diameter of between approximately 5 meters and approximately 45 meters, or between approximately 10 meters and approximately 40 meters, or between approximately 15 meters and approximately 35 meters. In other embodiments, each flange 206 may have any other suitable diameter. Each flange may have an extension portion 214 extending beyond the rounded outer surface of the drum 204. The extension portion 214 of a flange 206 may have a width measured from the outer surface of the drum 204 to an outer edge of the flange. The width of the extension portion 214 for each flange 206 may range between approximately 0.4 meters and approximately 2.4 meters, or between approximately 0.6 meters and approximately 1.8 meters, or between approximately 0.8 and approximately 1.2 meters. In other embodiments, the extension portion 214 of each flange 206 may have any other suitable width. In some embodiments, the flanges 206 may extend from the circular outer surface of the drum 204 itself. That is, the flanges 206 may extend radially from the drum 204, rather than being arranged over or on an end of the drum.

Additionally, the reel 202 may have a central longitudinal axis 216 about which the drum 204 and flanges 206 are configured to rotate. The reel 202 may include an axle or shaft extending along the axis 216 through the width of the drum 204 and through the thickness of each flange 206. In some embodiments, a support apparatus 218 may be arranged on or coupled to each end of the axle. The support apparatuses 218, including a bearing or other device for supporting the reel 202 with the axle or shaft, such that the drum 204 and flanges 206 may freely rotate about the axis in one or both directions of rotation. Rotation of the reel 202 about the axis 216 may be controlled automatically, partially automatically, or manually. For example, one or more motors or a hydraulic drive assembly may be configured to power rotation of the reel 202 about the axis 216.

Figure 4A:
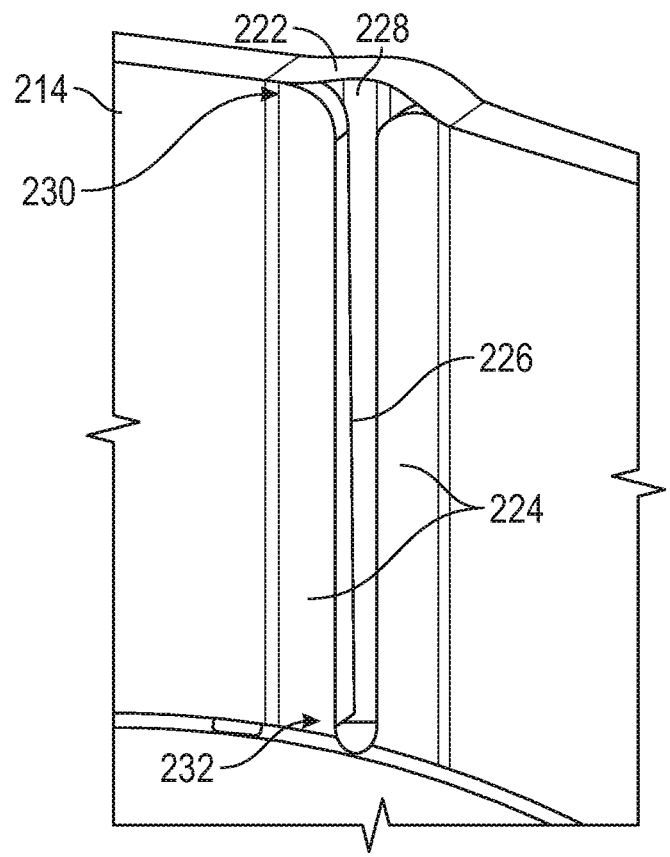
FIG. 4A is a detail view of a flange chute of a pipelay reel of the present disclosure, according to one or more embodiments.

In some embodiments, at least one flange 206 of the reel 202 may have a chute 208 configured to receive a starting end of the pipe 210. In some embodiments, the chute 208 may be arranged on an inner surface of an extension portion 214 of a flange 206. The chute 208 may be arranged in a radial direction (i.e., perpendicular to the drum 204 surface and perimeter edge of the flange 206), or the chute may be arranged at an angle to the radial direction. For example, the chute 208 may extend across the width of the extension portion 214, between the rounded outer surface of the drum 204 and the outer edge of the flange 206. FIG. 4A shows a detailed view of the chute 208, according to at least one embodiment. As shown, the chute 208 may generally be a cutout or recess in the extension portion 214 of the flange 206. The chute 208 may have a length extending between the drum 204 surface and the outer edge of the flange 206. The chute 208 may have a width or diameter extending perpendicular to its length. The width or diameter of the chute 208 may be between approximately 100 millimeters and 1200 millimeters, or between approximately 150 millimeters and approximately 900 millimeters, or between approximately 200 millimeters and approximately 600 millimeters. In other embodiments, the chute 208 may have a larger or smaller width or diameter.

Figure 4B:
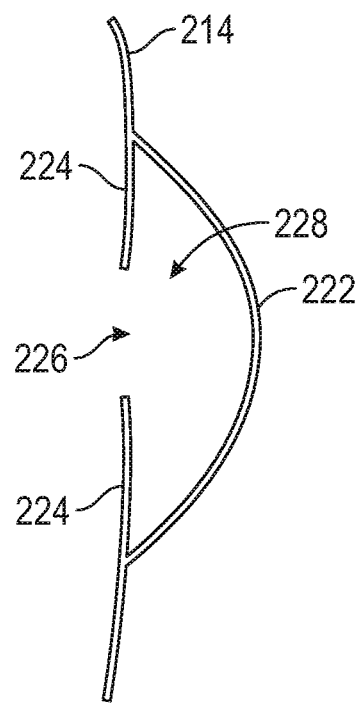
FIG. 4B is a top view of a flange chute of a pipelay reel of the present disclosure, according to one or more embodiments.

The chute 208 may generally be sized and shaped to receive an adapter 220 arranged at a starting end of the pipe 210. In this way, the chute 208 may be configured such that the adapter 220 may be arranged in the chute, while the attached pipe 210 extends from the chute to spool about the drum 204. In some embodiments, the chute 208 may have a rounded sidewall 222 that may generally bow outward to accommodate the adapter 220. As may be seen for example in FIGS. 4A and 4B, an outer sidewall 222 of the chute 208 may bow outward at an outer surface of the flange 206. The rounded sidewall 222 may have any suitable radius of curvature configured to accommodate an adapter 220 arranged at the starting end of the pipe. As additionally seen in FIGS. 4A and 4B, in some embodiments, the chute 208 may have one or more sidewall extension portions 224. Each sidewall extension portion 224 may extend from the inner surface of the flange 206 and across a portion of the width of the chute. As shown in FIGS. 4A and 4B, in some embodiments, a pair of sidewall extension portions 224 may extend from each side of the chute 208, toward one another, and across a portion of the width of the chute. The sidewall extension portions 224 may define a channel 226. As shown for example in FIG. 4B, the two sidewall extension portions 224 extending toward one another on an inner surface of the flange 206 may define a gap or channel 226 therebetween. The channel 226 may extend along the length of the chute 206, and may have a width configured such that the pipe or a portion of the adapter 220 may extend through the channel while the adapter is arranged in the chute.

As shown in FIG. 4A, the chute 208 may generally have a first end 230 and a second end 232. The first end 230 may be a receiving end configured to receive a starting end of the pipe and/or an adapter 220 coupled to the starting end of the pipe. The receiving end may include an opening 228 arranged on or near the outer edge of the flange 206. In some embodiments, the receiving end may have a flared, funnel-shaped, or bell-shaped opening 228, such that an inner sidewall of the chute 208 may flare outward at the receiving end. In some embodiments, the bell-shaped or flared opening 228 at the receiving end may be defined by the sidewall extension portions 224. For example, each sidewall extension portion 224 may have a rounded, curved, or tapered edge at the receiving end. The bell-shaped or flared shape of the opening 228 may help to position the adapter 220 into the chute 208. The rounded, curved, or tapered edges of the sidewall extension portions 224 may help guide the adapter 220 into the chute 208 without sharp corners snagging the adapter or pipe. Moreover, in some embodiments, the rounded sidewall 222 of the chute 208 may flare outward at the receiving end.

Figure 5:
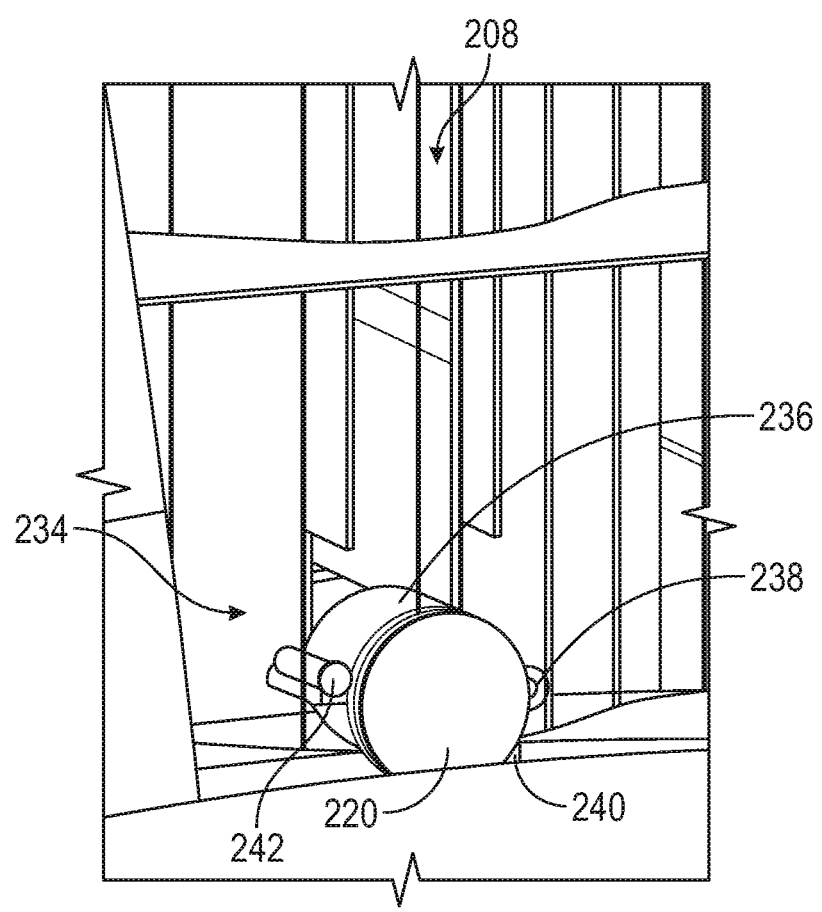
FIG. 5 is a detail view of a latching mechanism of a pipelay reel of the present disclosure, according to one or more embodiments.

The second end 232, which may be a latching end, may be positioned at an end of the length of the chute 208 opposite the first end 230. The latching end may be configured to secure the adapter 220 and/or pipe in the chute 208. For example, the latching end may have a latch 234 for securing the adapter in the chute. The latch 234 may generally prevent the adapter 220 and/or pipe from sliding back up the chute 208 and out of the chute through the receiving end. The latch 234 may be an automatic, partially automatic, or manual latch activatable when the adapter slides 220 down the chute 208 to reach the latching end. The latch 234 may use any suitable latching mechanism to secure the adapter 220 in the chute 208. In a particular embodiment, the latch 234 may be a clamshell latch, as shown for example in FIG. 5. The clamshell latch 234 may have an arm 236 sized and configured to be arranged over the adapter 220 when the adapter reaches the latching end of the chute 208. For example, where the adapter 220 has a rounded shape, the arm 236 may have a rounded or semi-circular shape for positioning over the adapter. The arm 236 may be arranged in the chute 208 and generally between the rounded sidewall 222 and the sidewall extension portions 224. In some embodiments, the arm 236 of the latch 234 may be pivotable about a point 238, such that the arm may pivot over the adapter 220 to secure the adapter, and may pivot away from the adapter to release the adapter. Moreover, the clamshell latch 234 may have a trigger plate 240 or other trigger component coupled to the arm 236 at the pivot point 238. The trigger plate 240 may be configured to cause rotation of the arm 236 when contacted. In this way, as the adapter 220 reaches the latching end and contacts the trigger plate 240, the trigger plate may cause the arm 236 to rotate about the pivot point 238 and over the adapter. The arm 236 may be secured automatically or manually over the adapter 220 with a pin 242 or other suitable securing mechanism. In other embodiments, other latching mechanism may be used to secure the adapter 220 and/or pipe at the latching end of the chute 208.

As generally described above, the flange chute 208 may be configured to receive an adapter 220 arranged at a starting end 210 of the pipe. The adapter 220 may generally be configured to engage with the chute 208 and latch 234, so as to couple the starting end 210 of the pipe to the reel 202. In some embodiments, the adapter 220 may have a chute portion and a pipe portion. The chute portion may be sized and shaped to be arranged within the chute 208. For example, the chute portion may have a generally cylindrical or spherical shape configured to be arranged in the chute 208. In some embodiments, the pipe portion, or another portion of the adapter 220, may be configured to extend through the channel 226 defined by the sidewall extension portions 224 of the chute 208. The pipe portion may couple the adapter 220 to the starting end 210 of the pipe using threading, an adhesive, welding, or any other suitable coupling mechanism. The pipe portion may generally couple to the chute portion at an angle, such as approximately an 90 degree angle. In this way, the adapter 220 may extend through the channel 226 of the chute 208, and may position the pipe to spool radially about the drum 204, parallel to the flange 206.

The adapter 220 may be sized for a particular pipe diameter in some embodiments. However, in other embodiments, the adapter 220 may be sized to couple to a variety of different pipe sizes. It is to be appreciated that in other embodiments, the chute 208 may be configured to receive the starting end of the pipe without an adapter 220.

As indicated above, the pipelay reel system 200 may have an initiation line 212 on a winch and configured to position the adapter 220 with respect to the flange chute 208. The initiation line 212 may be any suitable cable or line, such as a steel cable. The initiation line 212 may be arranged about a winch or drawworks operable automatically, partially automatically, or manually. Additionally, the initiation line 212 may be arranged about one or more sheaves or pulleys 244, as shown in FIG. 2, which may operate to change the direction of the line. The initiation line 212 may be configured to draw the pipe in a direction orthogonal to the longitudinal axis 216 of the reel drum 204. Additionally, the initiation line 212 may draw the pipe along a plane extending through or proximate to the flange chute 208. For example the sheave 244 or the winch may be aligned with the flange 206 having the flange chute 208. In this way, the initiation line 212 may be configured to draw the starting end 210 of the pipe toward the flange chute 208, such that the adapter 220 may engage with the chute. In some embodiments, the sheave 244 or winch may be arranged such that the initiation line 212 passes across an outer surface of the reel drum 204, adjacent the flange 206. The initiation line 212 maybe be configured to intersect the chute opening 228 at a radial position of the chute 208. In this way, the line 212 may intersect the drum 204 at a tangent point along the drum surface. The line 212 may define a tangent line between the drum 204 and the winch or sheave 244, and along which the top of the chute 208 is to be arranged to engage the adapter 220. The reel 202 may be rotated to properly arrange the top of the chute 208.

Figure 6:
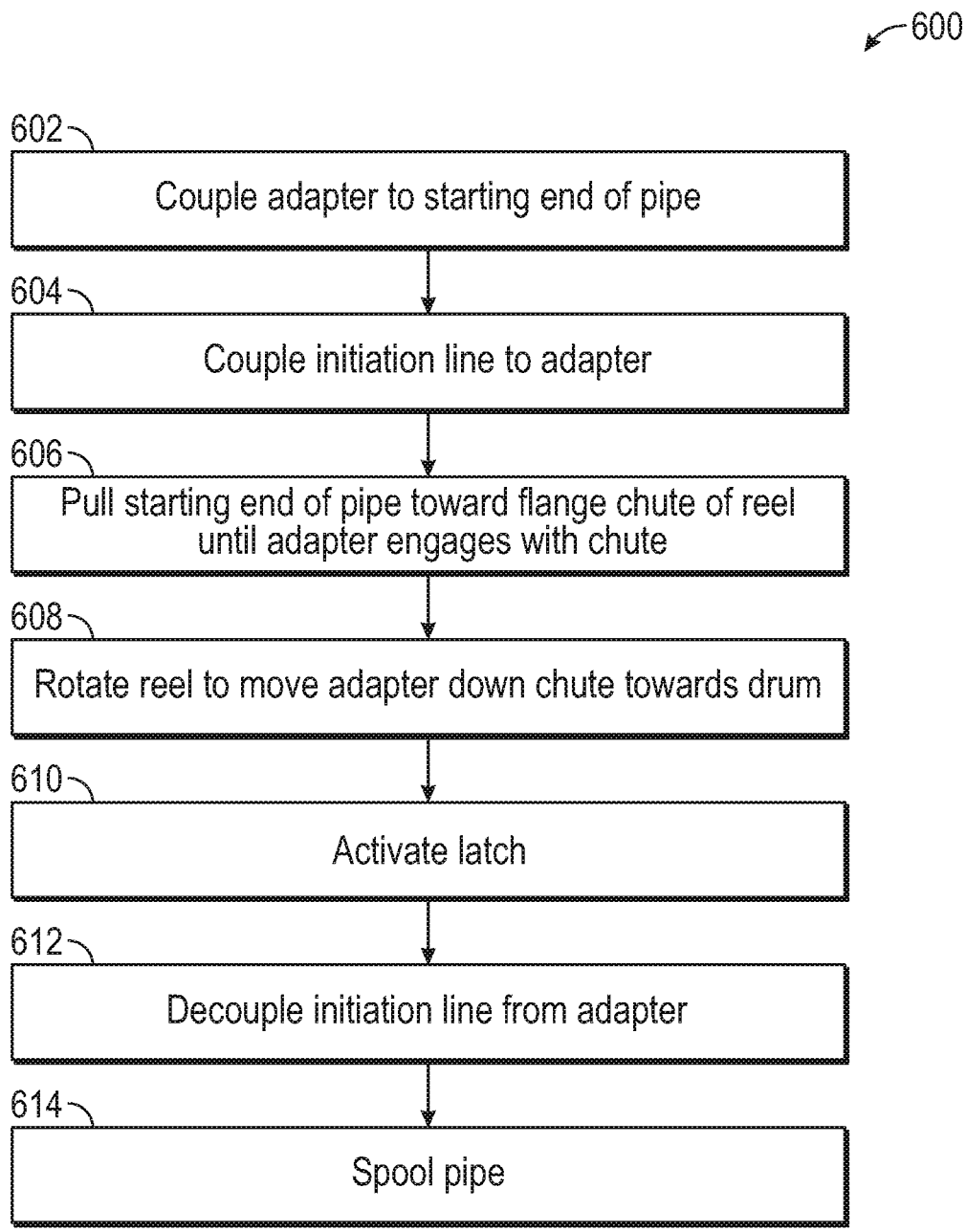
FIG. 6 is a flow diagram of a method of using a pipelay reel system of the present disclosure to initiate a pipe on a reel, according to one or more embodiments.

Turning now to FIG. 6, a method 600 for initiating a pipe on a reel is shown, according to one or more embodiments.

The method 600 may generally include the steps of coupling the adapter to the starting end of the pipe 602; coupling the initiation line to the adapter 604; pulling the starting end of the pipe toward the flange chute of the reel until the adapter engages with the chute 606; rotating the reel to move the adapter down the chute toward the drum 608; activating the latch 610; decoupling the initiation line from the adapter 612; and spooling the pipe 614. In other embodiments, the method 600 may include additional or alternative steps.

Coupling the adapter to the starting end of the pipe 602 may include threading the adapter onto the pipe in some embodiments. In other embodiments, as indicated above, other attachment mechanisms may be used to attach the adapter to the pipe end. The starting end of the pipe may be an end of the pipe that will be first spooled onto the reel. In one or more embodiments, the adapter may be installed permanently or removably by the pipe manufacturer. Before or after the adapter is coupled to the starting end of the pipe, the initiation line may be coupled to the adapter 604. As indicated above, the initiation line may be coupled to a winch, and may be reeved about one or more sheaves. As additionally indicated above, the initiation line may be aligned with a the flange of the reel having the chute such that the initiation line may intersect the chute or the chute opening. The spool may be rotated to align the chute with the line/pipe when tensioned. The winch and initiation line may be used to pull the starting end of the pipe (with adapter) toward the flange chute of the reel 606. In some embodiments, the reel may first be positioned such that the receiving end of the chute may be aligned with the initiation line. The initiation line may pull the adapter and pipe end toward the receiving end of the chute, such that the adapter "catches" on or engages at the receiving end of the chute. Rotation of the reel 608 in a same direction as the pull of the initiation line may cause the flange chute to rotate upward, and may in turn cause the adapter to slide down the chute toward the drum. In some embodiments, the reel may be rotated simultaneously with the pull of the initiation line. The winch may maintain tension on the line while initially rotating the spool such that the catenary action due to the tension in the line and the pipe drawn the adapter down along the chute. In some embodiments, a spooling gantry may be used to deflect or adjust the path of the pipe as it moves toward the chute.

Figure 8:
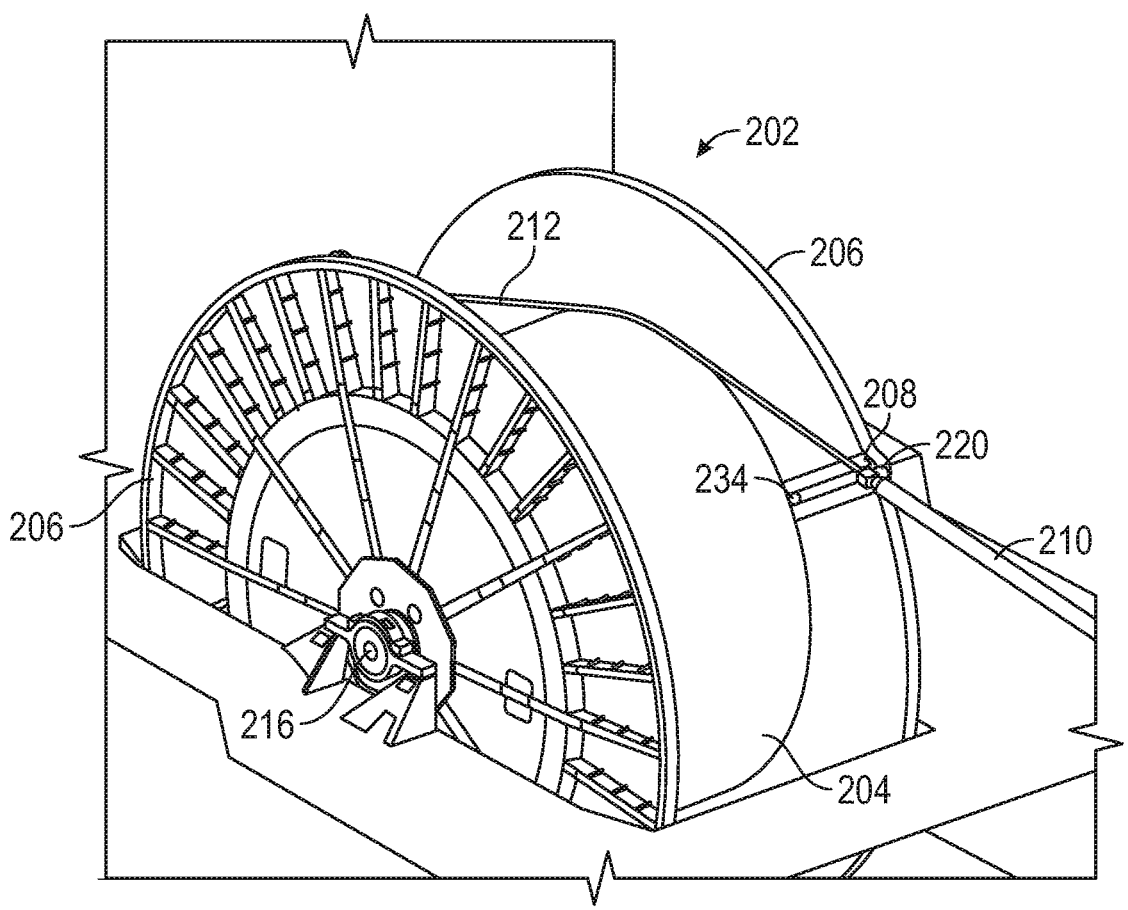
FIG. 8 is a perspective view of the pipelay reel system of the present disclosure, showing the starting end of the pipe at the receiving end of the flange chute, according to one or more embodiments.
Figure 9:
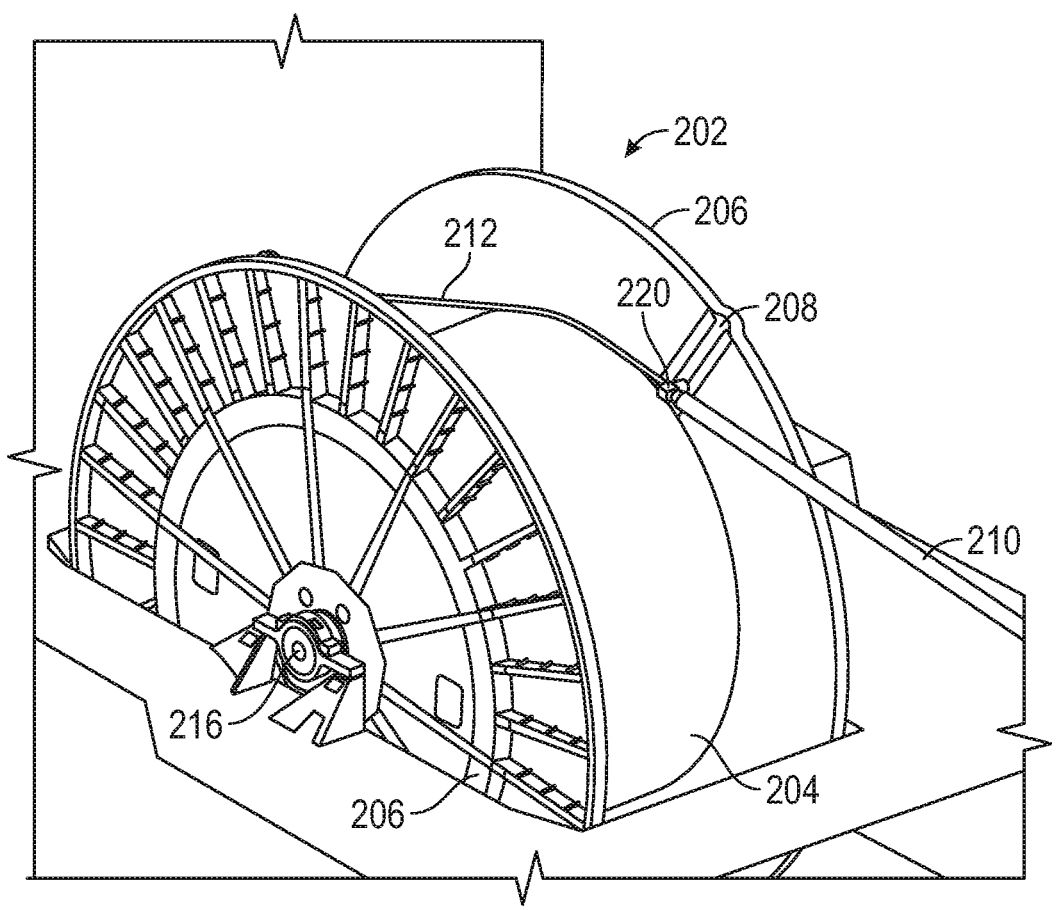
FIG. 9 is a perspective view of a pipelay reel system of FIG. 8, showing the starting end of the pipe progressing down the flange chute as the reel rotates, according to one or more embodiments.
Figure 10:
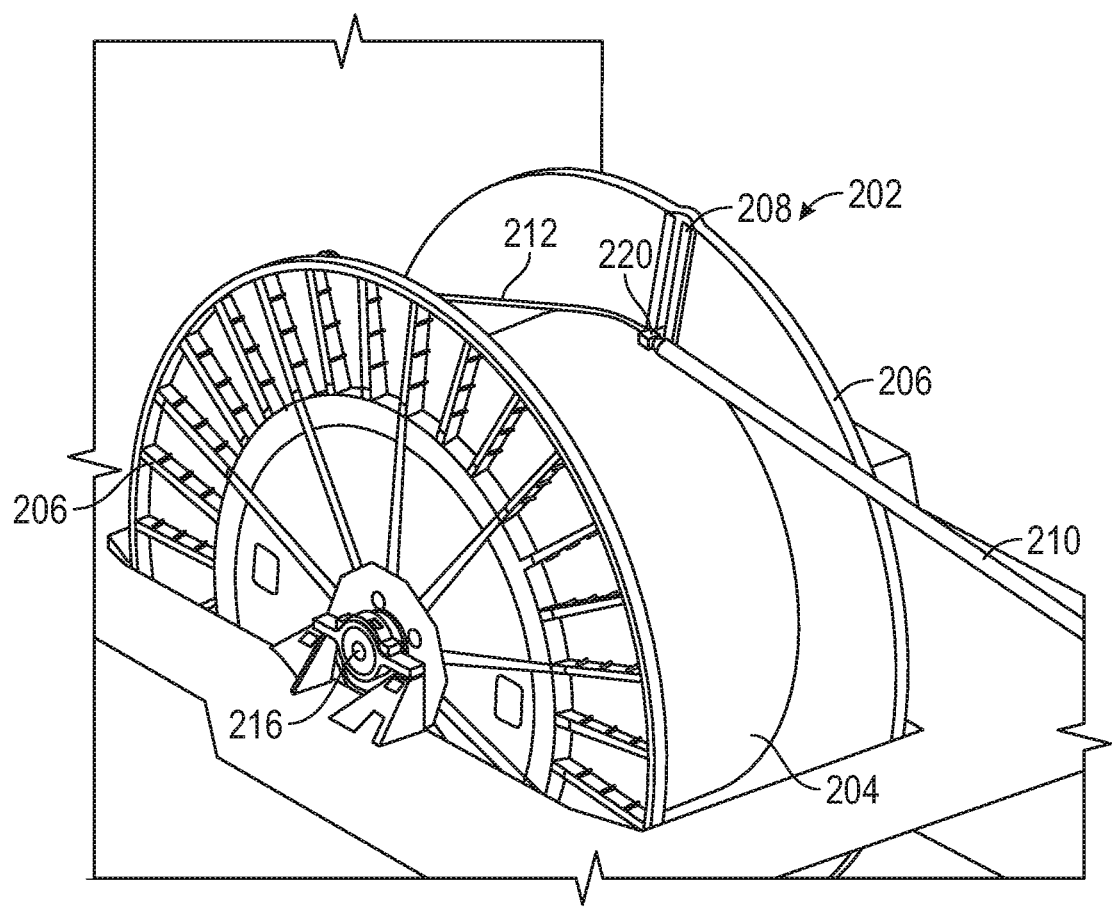
FIG. 10 is a perspective view of the pipelay reel system of FIG. 8, showing the starting end of the pipe at the latching end of the flange chute, according to one or more embodiments.

FIGS. 8-10 show a progression, according to one embodiment, of the adapter 220 and pipe starting end 210 being pulled by the initiation line 212 toward the chute 208, while the reel 202 rotates. As shown, the reel 202 may rotate back toward the winch or sheave 244, or generally in the direction of pull of the initiation line 212. The initiation line 212 may be arranged to intersect the flange, and/or the opening of the chute 208, as shown in FIG. 8. At the intersection, the adapter 220 may engage with the opening of the chute 208. It is to be appreciated that the rotation of the reel 202 and the pulling of the initiation line 212 may be timed and/or the rates may be adjusted such that the adapter 220 may meet the chute 208 at the point where the initiation line intersects the flange 206. As shown in FIGS. 9 and 10, after the adapter 220 engages with the chute 208, the reel 202 may continue to rotate in a same direction. The continued rotation of the reel 202 may cause the adapter 220 to travel down the chute 208 to the latch 234. As the reel 202 rotates to pull the adapter 220 down the chute 208, the initiation line 212 may continue to be drawn. In some embodiments, the initiation line 212 may be drawn at a same or similar speed as the rotational speed of the reel 202. Once rotation of the reel 202 causes the chute 208 to reach a peak or uppermost position, and thus the adapter is at the bottom of the chute, as shown in FIG. 10, the latch 234 may be activated to secure the adapter 220.

As the flange chute reaches a peak or uppermost rotational position on the reel due to rotation of the reel, the adapter may automatically fall to the latching end of the chute, due to gravitational forces, rotational force of the reel, and tension in pipe itself. With the adapter at the latching end of the chute, the latch may be activated 610 automatically or manually to secure the adapter in the chute. Additionally, the initiation line may be decoupled from the adapter 612. In some embodiments, decoupling the initiation line may include cutting the initiation line, or otherwise manually or automatically decoupling the initiation line from the adapter. Once the initiation line is decoupled, rotation of the reel may continue to spool the pipe 614.

Figure 11:
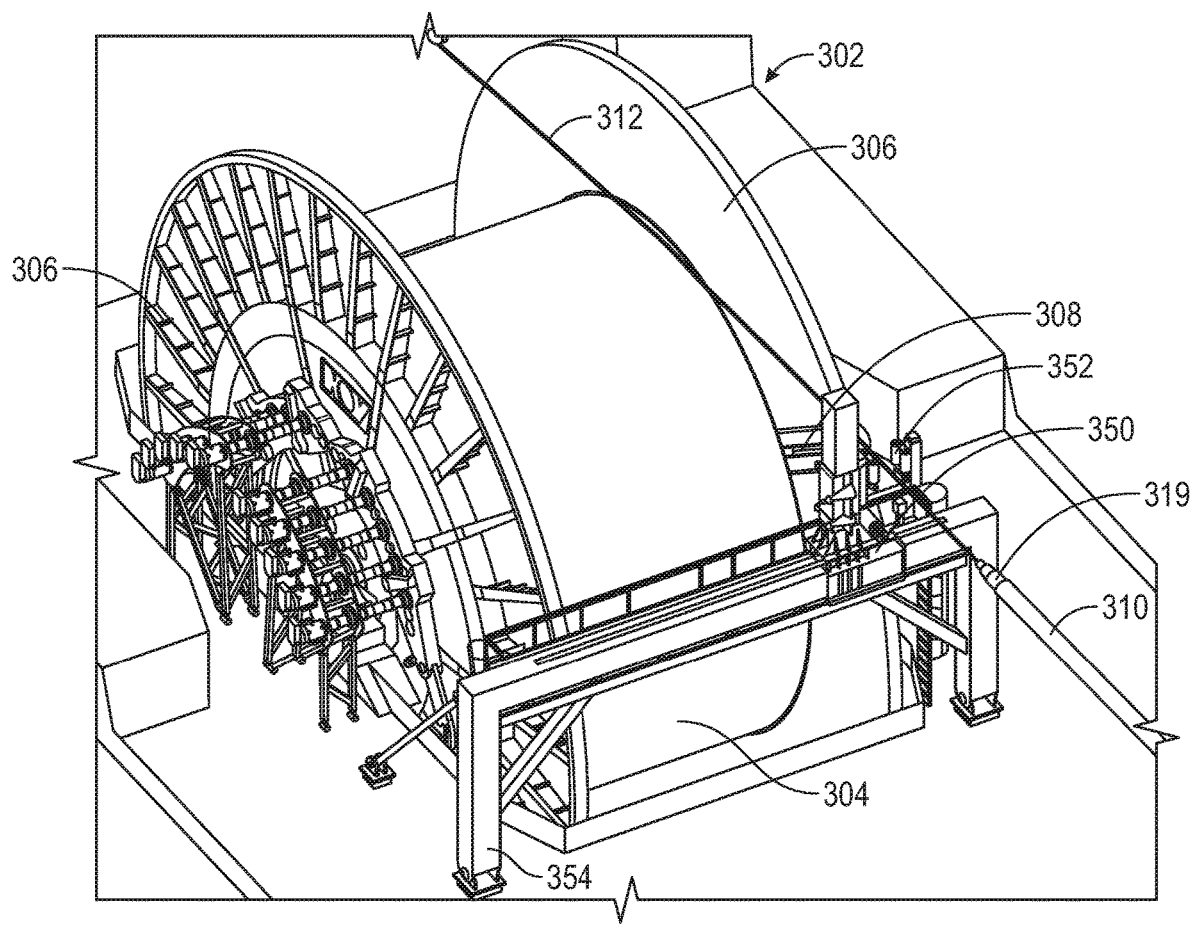
FIG. 11 is a perspective view of a pipelay reel system of the present disclosure, showing a starting end of the pipe being drawn toward the flange chute by the initiation line.
Figure 12:
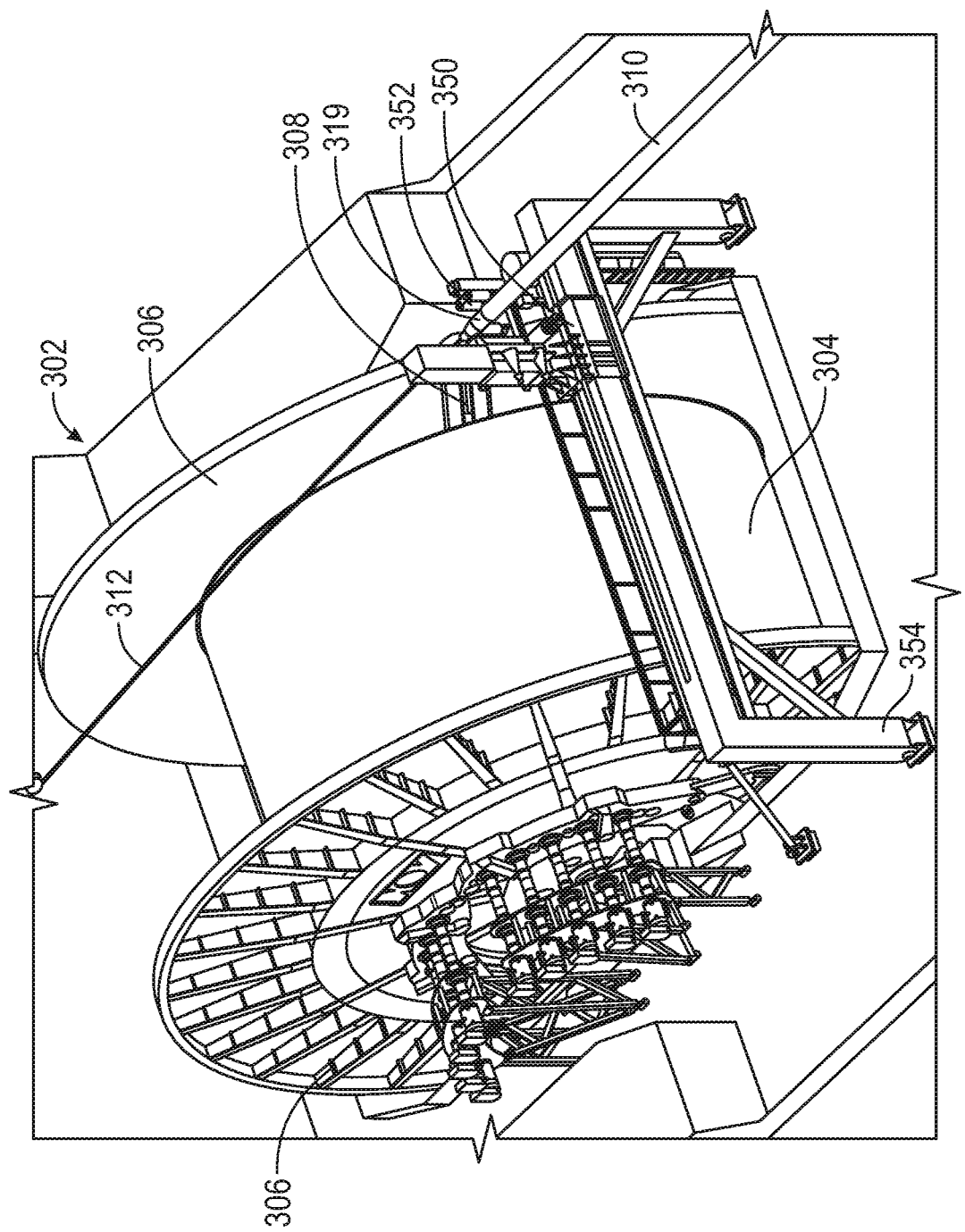
FIG. 12 is a perspective view of the pipelay reel system of FIG. 11, showing the starting end of the pipe being pulled across a spooling guide and toward the flange chute.
Figure 13:
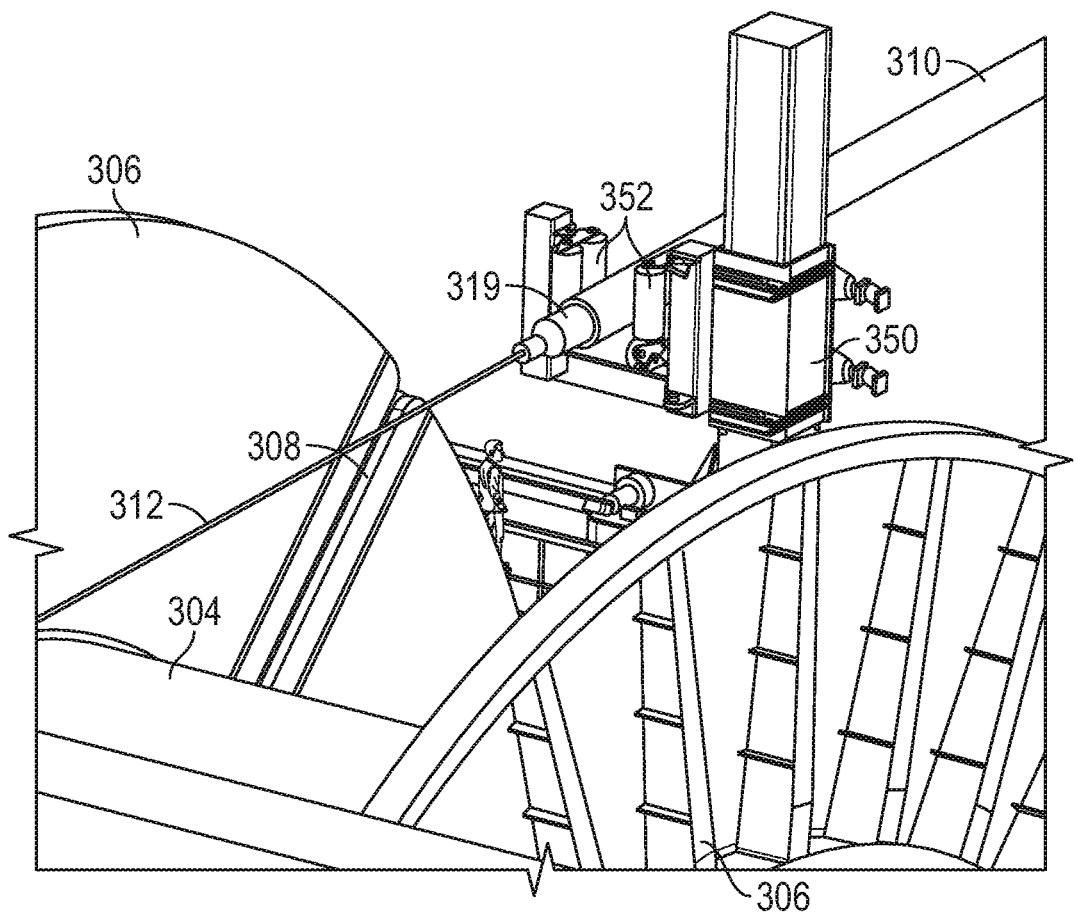
FIG. 13 is a close up perspective view of the pipelay reel system of FIG. 11, showing the starting end of the pipe being pulled across the spooling guide and toward the flange chute.

FIGS. 11-16 show another embodiment of a progression of a starting end of a pipe 310 pulled toward a flange chute 308 to engage the chute. As shown in FIG. 11, an initiation line 312 may be coupled to a starting end of a pipe 310 via a pipe head 319. The initiation line 312 and the reel 302 may be arranged such that the initiation line runs tangent to the drum 304 of the reel and/or generally, intersects with an opening of the flange chute 308 on the flange 306. The initiation line 312 may additionally be configured to pull the pipe 310 across a spooling guide 350 arranged on a mount 354. In some embodiments, the spooling guide 350 may have a pipe tensioner 352 for tensioning the pipe as it is pulled toward the reel 302. As shown in FIGS. 12 and 13, the initiation line 312 may pull the pipe 310 across the spooling guide 350.

Figure 14:
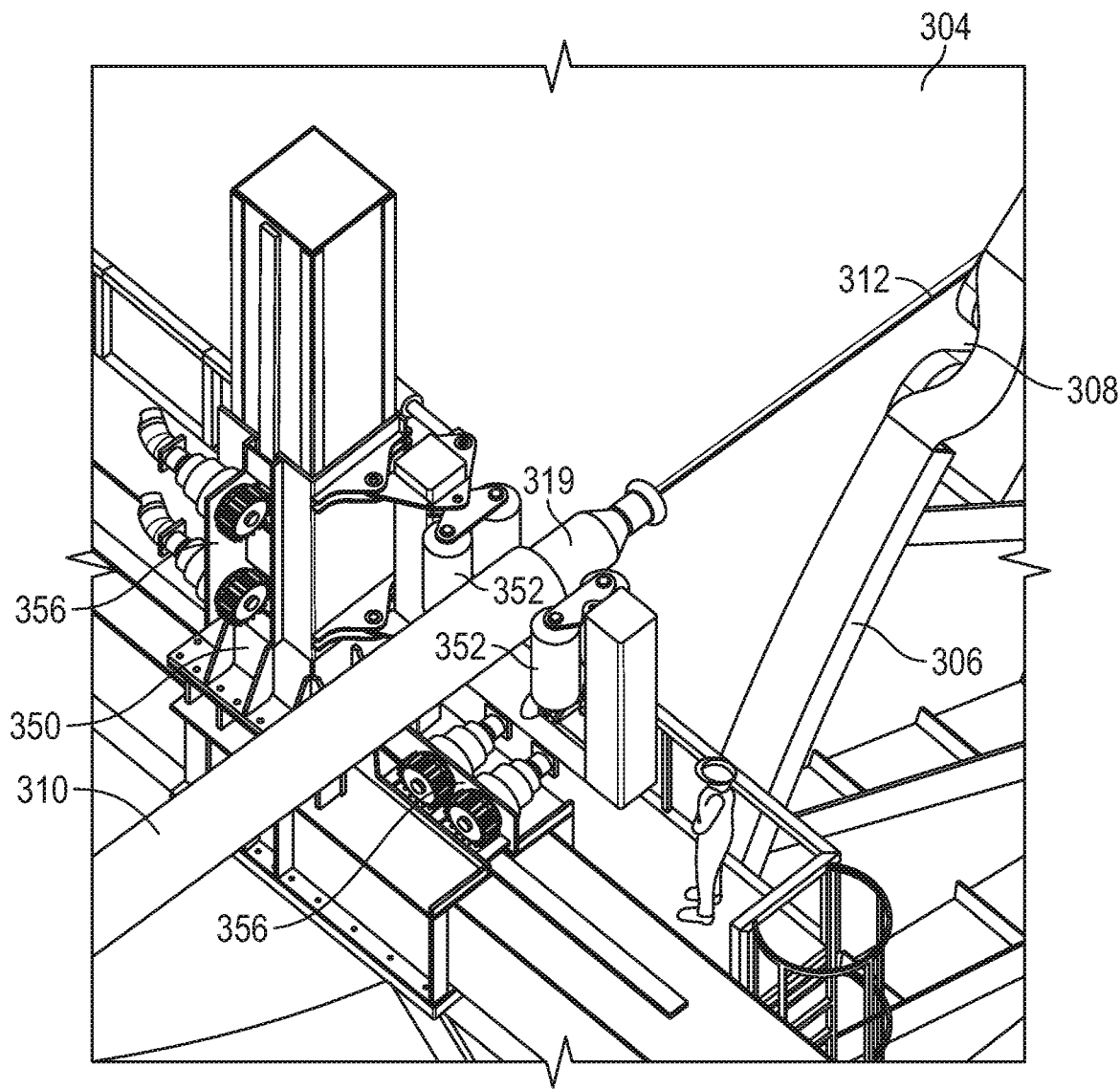
FIG. 14 is another close up perspective view of the pipelay reel system of FIG. 11, showing the starting end of the pipe with an adapter being pulled across the spooling guide and toward the flange chute.

In some embodiments, the spooling guide 350 may be configured to move in one or more directions relative to the reel 302. This may allow positioning of the spooling guide 350 to be adjusted to compensate for catenary, and to support the weight of the pipe 310. As shown in FIG. 14, for example, the spooling guide 350 may have one or more rack and pinion systems 356 for moving the spooling guide in one or more directions. For example, the rack and pinion systems 356 may operate to move the spooling guide 350 along a first axis, which may be generally parallel to a longitudinal axis of the reel 302. Additionally or alternatively, the rack and pinion systems 356 may operate to move the spooling guide 350 along a second axis, which may be perpendicular to the first axis. Additionally or alternatively, the rack and pinion systems 356 may operate to move the spooling guide 350 along a third axis, which may be perpendicular to both the first and second axes. The rack and pinion systems 356 may be controlled automatically, partially automatically, or manually. In other embodiments, other mechanisms, such as one or more roller systems, cable systems, and/or other suitable mechanisms may be used to move the spooling guide in one or more directions.

Figure 15:
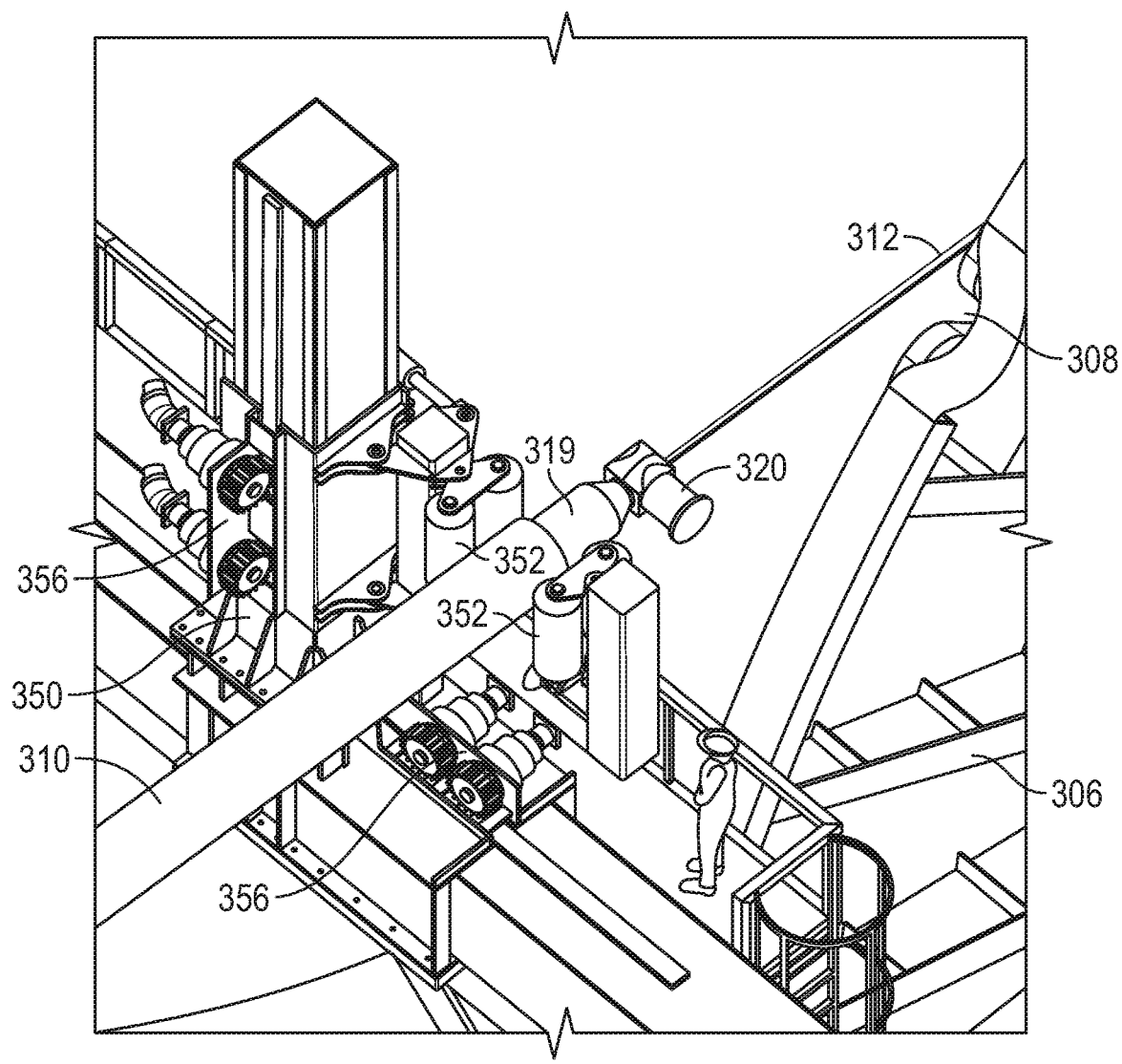
FIG. 15 is a close up perspective view of the pipelay reel system of FIG. 11, showing the starting end of the pipe with an adapter being pulled across the spooling guide and toward the flange chute.
Figure 16:
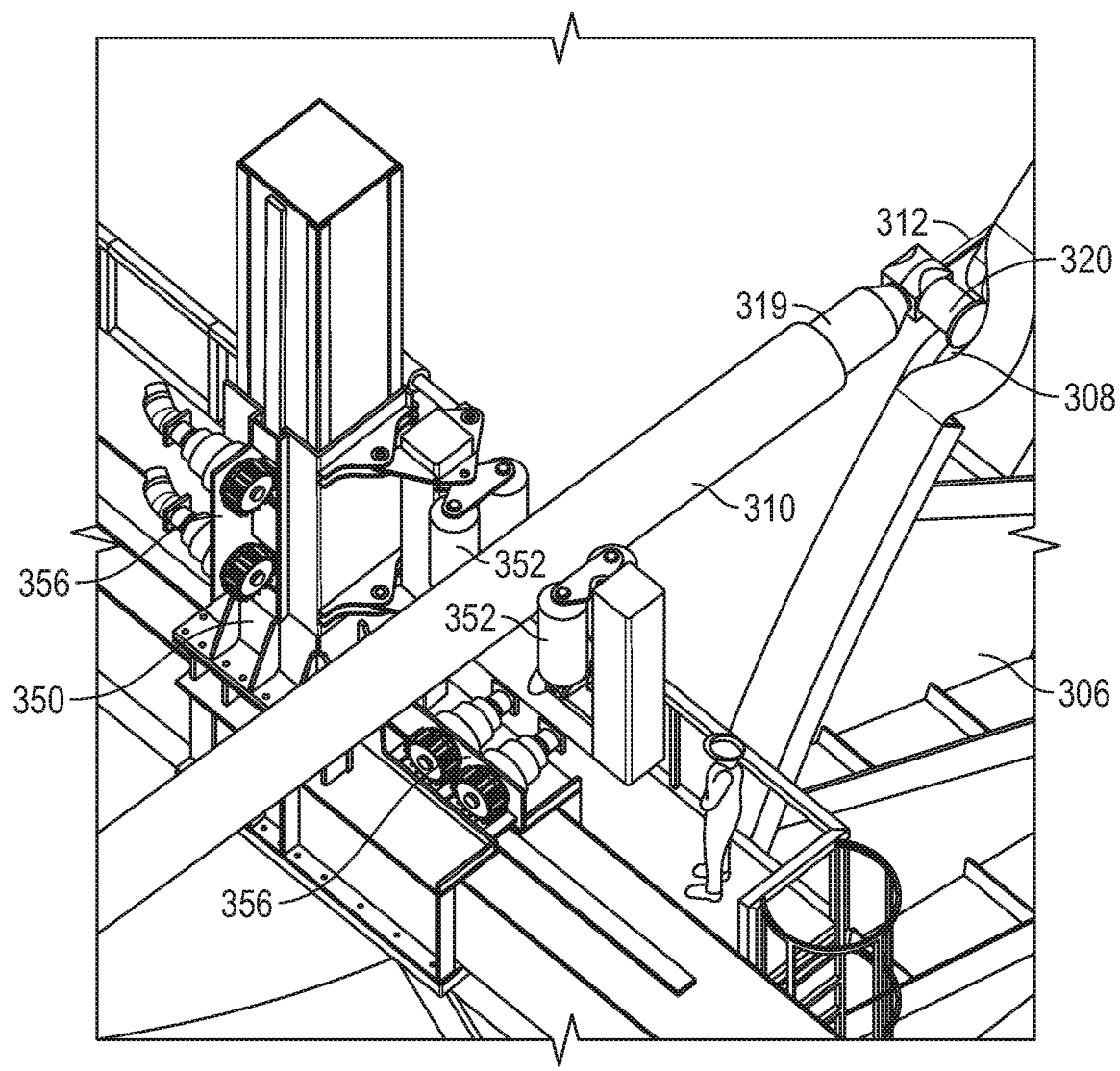
FIG. 16 is a close up perspective view of the pipelay reel system of FIG. 11, showing the adapter engaging with the flange chute.

FIG. 15 shows the starting end of the pipe 310 with an adapter 320 coupled to the pipe head 319 for engaging with the flange chute 308. The adapter 320 may be coupled to the pipe head 319 while the pipe head is coupled to the initiation line 312 in some embodiments, prior to engagement of the pipe 310 with the flange chute 308. As shown in FIG. 16, once the adapter 320 is arranged on the pipe head 319, the initiation line 312 may operate to pull the adapter toward the flange chute 308 to engage with the flange chute. As described above, the reel 302 may be rotated, in some embodiments while the initiation line 312 continues to pull, to cause the adapter 320 to travel down the flange chute 308, where a latch or other mechanism may be used to secure the adapter in place.

Figure 7:
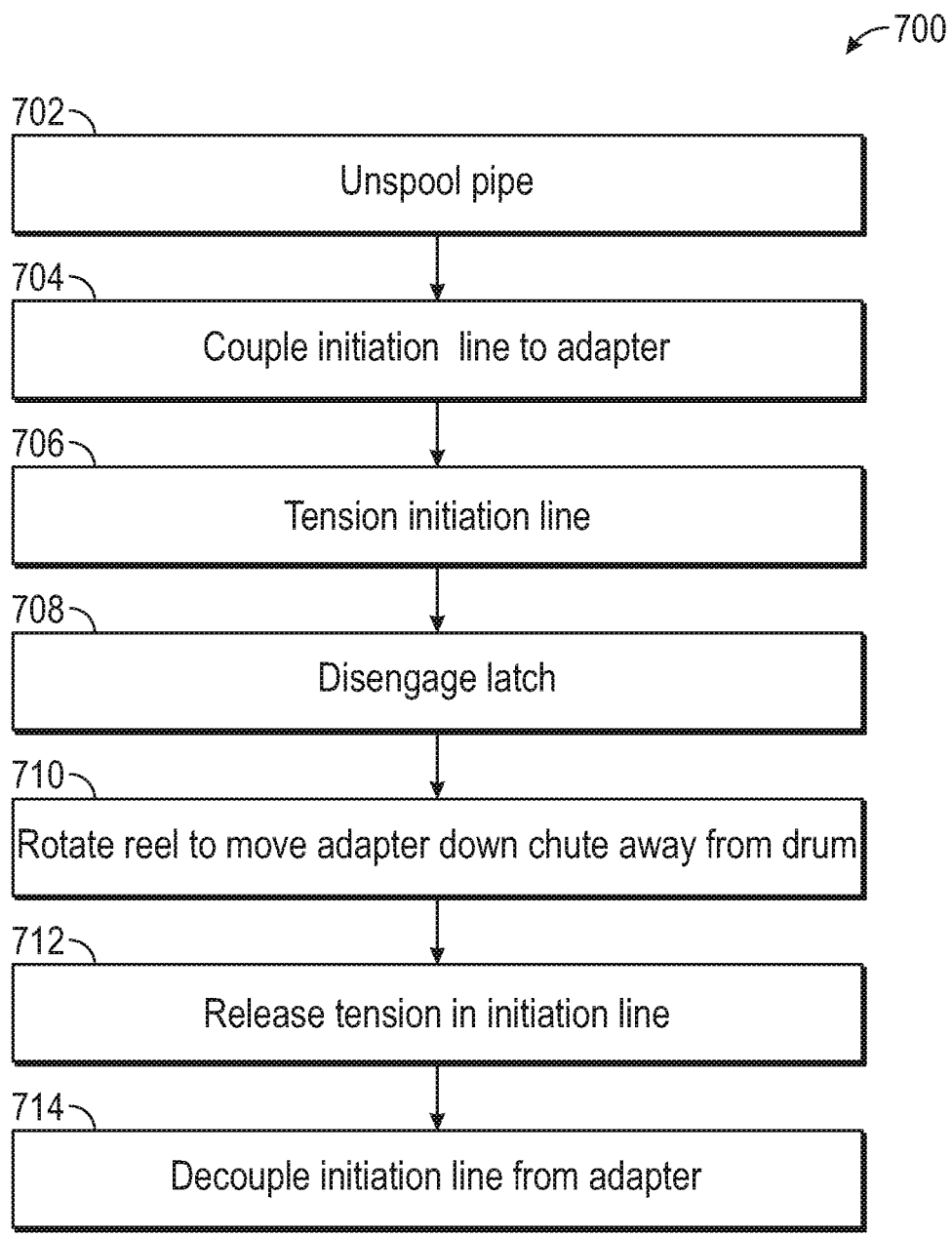
FIG. 7 is a flow diagram of a method of using a pipelay reel system of the present disclosure to abandon a pipe from a reel, according to one or more embodiments.

Once the pipe is spooled onto the reel, the pipe may be unspooled for use in offshore operations or any other suitable operation. Abandonment may include decoupling the starting end of the pipe from the reel once the reel has been unspooled from the reel or otherwise used. FIG. 7 shows one embodiment of a method 700 of abandonment, according to at least one embodiment. As shown, the method 700 may generally include the steps of unspooling the pipe 702; coupling the initiation line to the adapter 704; tensioning the initiation line 706; disengaging the latch 708; rotating the reel to move the adapter down the chute away from the drum 710; releasing tension in the initiation line 712; and decoupling the initiation line from the adapter 714. In other embodiments, the method 700 of abandonment may include additional or alternative steps.

As indicated above, the pipe may generally be unspooled from the reel prior to abandonment. The initiation line, or another winch line, may be manually or automatically coupled to the adapter using any suitable coupling method. In some embodiments, the reel may be rotated to position the flange chute in a peak or uppermost radial position. Once coupled to the adapter, the winch may be used to tension the initiation line. In this way, the tensioned initiation line may help to hold the adapter at a central position at the latching end of the chute, allowing for safe release of the latch. The latch may be disengaged, such that the adapter is no longer secured at the latching end of the chute. Tension in the initiation line may be released while unspooling the winch. The reel may be rotated to move the chute downward from its peak position, such that the adapter may generally be lifted out of the receiving end of the chute, due to rotational motion of the reel and tension in the pipe and line. A spooling gantry may be used to adjust deflection as the adapter nears the receiving end of the chute, in order to compensate for any torque that may be generated by the plasticity of the pipe. It is to be appreciated that abandonment may generally be the reverse of initiation, and is shown in the reverse of FIGS. 8-11. The initiation line may be decoupled from the adapter, and/or the adapter may be decoupled from the pipe, in order to abandon the starting end of the pipe.

A pipelay reel system of the present disclosure, and the initiation and abandonment methods described herein, may allow for more efficient and/or faster initiation and abandonment. In some cases, the initiation and abandonment methods described herein may allow for the use of less equipment than conventional initiation and abandonment methods. In particular, the use of the initiation line for an inline pull of the pipe toward the flange chute opening may mitigate or eliminate the need for additional push/pull systems, lines, or winches conventionally used to locate the starting end of the pipe. In this way, a single line may be used to both initiate and abandon the pipe. Additionally, the initiation and abandonment methods described herein may be performed without the need for human involvement at the reel. That is, the methods may be performed without the need for manbaskets and fall arrest equipment, and may be performed relatively safely. The alignment of the initiation line with the flange chute opening, and the automatically activated latch in the flange chute may permit the initiation and abandonment methods to be performed relatively safely and with fewer personnel.

A pipelay reel system may be used for spooling and unspooling a steel, aluminum, plastic, or other material pipe. The pipe may be flexible, semi-flexible, or rigid. The pipe may have any suitable diameter, such as between approximately 2 inches and approximately 20 inches. The pipe may be pressurized or unpressurized. In other embodiments, the pipelay reel system may be used with other products, such as a cable or line, instead of a pipe. Moreover, as indicated above, a pipelay reel system of the present disclosure may be configured for on or offshore use. For example, a pipelay reel system may be arranged on a vessel for laying subsea pipe. A pipelay reel system of the present disclosure may be useable for oil drilling, or oil well servicing or maintenance operations. Additionally, a pipelay reel system of the present disclosure may be useable for other operations and/or industries.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A pipelay reel system comprising:
an adapter for coupling to a starting end of a pipe;
a pipelay reel rotatable about an axis and having a drum arranged between two flanges, at least one of the two flanges comprising a flange chute having an opening configured to receive the adapter; and
an initiation line extending from a winch and configured for coupling to the adapter, the initiation line extending parallel to the flanges and further configured to pull the adapter toward the opening.

2. The pipelay reel system of claim 1, further comprising a pipe having a starting end coupled to the adapter.

3. The pipelay reel system of claim 1, wherein the initiation line extends along a same plane on which the opening of the flange chute is arranged, and is configured to intersect the opening at a radial location of the opening.

4. The pipelay reel system of claim 1, wherein the initiation line extends across an outer surface of the drum.

5. The pipelay reel system of claim 1, wherein the flange chute extends between the opening and the drum.

6. The pipelay reel system of claim 1, wherein the at least one flange comprising a flange chute additionally comprises a latch configured to secure the adapter in the chute.

7. The pipelay reel system of claim 6, wherein the latch is a clamshell latch.

8. The pipelay reel system of claim 6, wherein the chute extends between a first end and a second end, and wherein the opening is arranged at the first end, and the latch is arranged at the second end.

9. A method of using a pipelay reel system, the method comprising:
coupling an initiation line to an adapter arranged at a starting end of a pipe;
rotating a pipelay reel about a longitudinal axis, the pipelay reel having a drum arranged between two flanges, and a flange chute arranged on at least one flange of the two flanges, the flange chute having an opening arranged on an edge of the at least one flange and configured to receive the adapter;
using the initiation line, pulling the adapter along an axis intersecting the opening of the flange chute at a radial location of the flange chute until the adapter engages the flange chute at the opening;
rotating the pipelay reel, such that the adapter slides down the chute toward the drum; and
activating a latch to secure the adapter within the flange chute.

10. The method of claim 9, further comprising decoupling the initiation line from the adapter, and spooling the pipe onto the drum.

11. The method of claim 10, further comprising:
unspooling the pipe from the drum;
coupling the initiation line to the adapter;
disengaging the latch; and
rotating the pipelay reel about longitudinal axis, such that the adapter slides up the chute and out through the opening.

12. The method of claim 9, wherein the flange chute has a length extending between a first end and a second end opposing the first end, and wherein the opening is arranged at the first end, and the latch is arranged at the second end.

13. The method of claim 12, wherein the latch is activated automatically when the adapter reaches the second end.

14. The method of claim 13, wherein the opening comprises a bell shape.

15. A pipelay reel comprising:
a drum having a longitudinal axis, the drum configured to rotate about the longitudinal axis and further configured for spooling and unspooling a pipe;
a pair of flanges, each flange arranged at an end of the longitudinal axis of the drum, wherein each flange comprises a flange extension portion extending beyond an outer surface of the drum; and
a flange chute arranged on a flange extension portion of at least one of the pair of flanges, the flange chute having a length extending perpendicular to the longitudinal axis of the drum, wherein the flange chute comprises a latch arranged at an end of the flange chute adjacent the drum.

16. The pipelay reel of claim 15, wherein the flange chute comprises a first end arranged at an outer edge of the flange on which the flange chute is arranged, and a second end opposing the first end.

17. The pipelay reel of claim 16, wherein the latch is configured to secure and position a starting end of a pipe.

18. The pipelay reel of claim 17, wherein the latch is configured to receive an adapter coupled to the starting end of the pipe.

19. The pipelay reel of claim 17, wherein the latch is a clamshell latch.

20. The pipelay reel of claim 15, wherein the flange chute comprises a pair of sidewall extension portions defining a channel parallel with an inner surface of the flange extension portion and extending along the length of the chute.

* * * * *